Sept. 23, 1924.                                            1,509,545
P. C. DAHL
ADJUSTABLE FENDER BRACE
Filed March 22, 1924
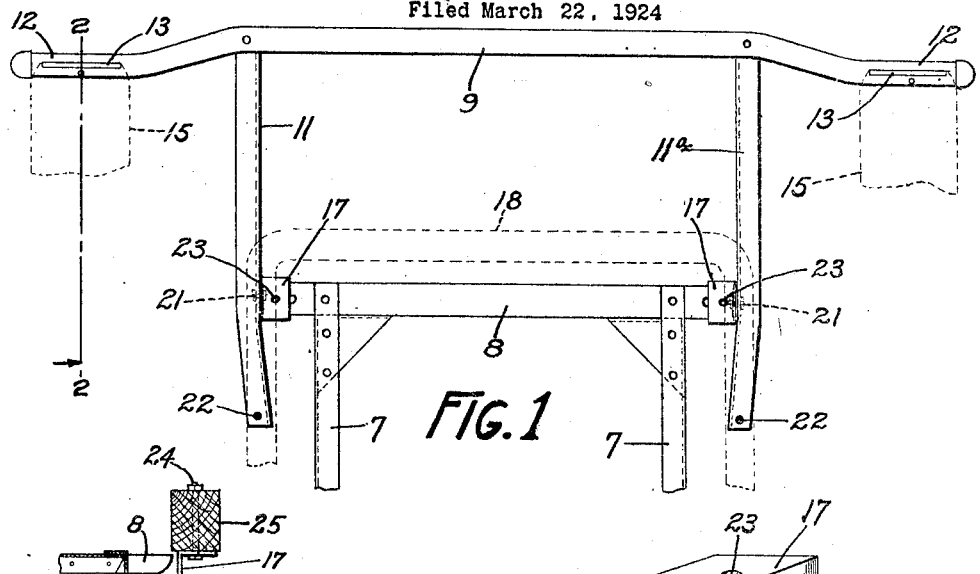
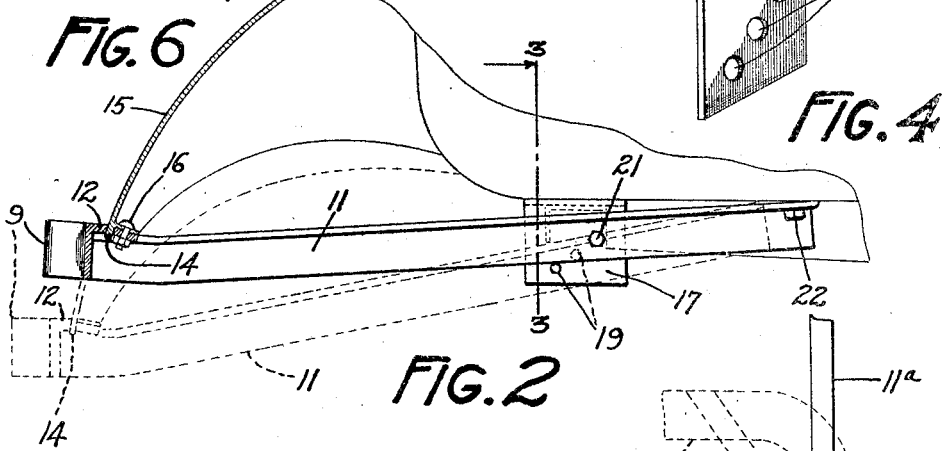
INVENTOR
PETER C. DAHL
ATTORNEYS Patented Sept. 23, 1924.

1,509,545

UNITED STATES PATENT OFFICE.

PETER C. DAHL, OF WAHPETON, NORTH DAKOTA.

ADJUSTABLE FENDER BRACE.

Application filed March 22, 1924. Serial No. 701,121.

*To all whom it may concern:*

Be it known that I, PETER C. DAHL, a citizen of the United States, resident of Wahpeton, county of Richland, and State of North Dakota, have invented certain new and useful Improvements in Adjustable Fender Braces, of which the following is a specification.

This invention relates to improvements in adjustable fender braces particularly adapted for use on automobiles, and more particularly relates to such a device adapted to be mounted on the rear end of an automobile as a protection against injury and to support and protect the rear fenders.

The particular object of this invention is to provide an adjustable fender brace having means whereby it may readily be fitted to cars of different sizes and on which cars the fenders may also be of different sizes and shapes.

A further object of the invention is to provide such a device of simple and inexpensive construction which can be manufactured at a minimum cost.

Other objects will more fully appear from the following description and the accompanying drawings and will be pointed out in the annexed claims.

In the drawings there has been disclosed a structure designed to carry out the various objects of the invention but it is to be understood that the invention is not confined to the exact features shown as various changes may be made within the scope of the claims which follow.

In the accompanying drawings forming a part of this specification.

Figure 1 is a plan view of a novel adjustable fender brace showing how it is positioned with respect to the rear end of the chassis frame, and also showing in dotted lines how the fenders are connected to the brace;

Figure 2 is a sectional view on the line 2—2 of Figure 1 showing the preferred manner of mounting the device on the automobile, and also showing how it may be adjusted to adapt it to fenders of different sizes;

Figure 3 is a detail sectional view on the line 3—3 of Figure 2;

Figure 4 is a perspective view of one of the brace-supporting brackets;

Figure 5 is a plan view of a portion of the rear end of the chassis frame showing how the device is secured to an automobile having a wider or larger body; and Figure 6 is a detail sectional view on the line 6—6 of Figure 5.

In the accompanying drawings there is shown an adjustable fender brace designed particularly for use on the well-known Ford type of automobile, and in order to disclose its application there is illustrated the rear end portion of a Ford chassis frame, comprising the usual frame members 7 and rear cross member 8.

The novel apparatus here shown comprises a bar 9 secured to the rear end portion of the automobile by means of a pair of oppositely disposed supporting arms 11 and 11ª. The end portions 12 of the bar 9 are preferably off-set as shown, and are provided with elongated apertures 13 adapted to receive the marginal edges 14 of the tips or ends of the rear fenders 15. The horizontal flange of each end portion 12 adjacent the elongated apertures 13, is preferably downwardly inclined, as shown in Figure 2, in order to coincide with the marginal flange of the fender bearing thereagainst. Each fender is suitably secured to the bar by means of a bolt 16.

An important feature of this invention resides in the novel means provided for securing the supporting arms 11 and 11ª, and therefore the bar 9, to the automobile. As shown in Figures 2 and 3, such means consists preferably of a pair of right angled brackets 17 mounted on the outwardly extending end portions of the cross member 8, and having the sill 18 of the body arranged thereon. The depending leg or portion of the bracket 17 has a series of apertures 19 provided therein. These apertures are preferably arranged at an angle as particularly shown in Figures 2 and 4, so that the position of the supporting arms 11 and 11ª may be adjusted thereon with reference to the chassis frame, in order that the bar 9 may be adjusted to fit fenders of various sizes as clearly shown by the full and dotted lines in Figure 2.

As here shown, the supporting arms 11 and 11ª are secured to these brackets by means of suitable bolts 21 and as shown in Figures 1 and 2, the inner ends of the arms are suitably secured to the sill 18 of the body by suitable bolts or screws 22.

In mounting the brackets 17 on the cross member 8 the usual bolts, (not shown) securing the sill 18 thereto, are preferably loosened and the sill slightly lifted from the cross member. The brackets are then inserted between the sill and cross member and the bolts tightened thereby securely securing the brackets to the frame. When the brackets have thus been positioned the supporting arms 11 and 12 may be secured thereto and to the sill 18 by means of the bolts 21 and 22, the bolts 21 being inserted in the selected aperture 19 to properly position the end portions 12 of the bar 9 to receive the marginal flange or edge 14 of the fenders, as shown in Figure 2.

In Figures 5 and 6, there is shown a slightly different method of securing the supporting arms 11 and 11ᵃ to the automobile, which is particularly adaptable to automobiles having a relatively wider body which substantially overhangs the ends of the cross member 8, as in the 1924 model Ford automobiles. As here shown, the brackets 17 are reversed from that shown in Figures 1, 2, 3 and 4, so as to have their upper or horizontal portions outwardly projecting over the supporting arms. An aperture 23 is provided in each bracket 17 to receive a bolt 24 which upwardly passes through the sill 25 of the body as shown in Figure 6. The supporting arms 11 and 11ᵃ are secured to the brackets and to the sill 25 by means of the bolts 21 and 22 in a manner similar to that shown and described with reference to the other figures.

I claim as my invention:

1. The combination with a car frame and wheel fenders, of a bar having means for connection with the adjacent ends of opposite fenders, and supports for said bar on said frame, and adapted for adjustment of said bar to fit fenders of different sizes.

2. The combination with a car frame and its wheel fenders, of a bar having means for connection with the opposite fenders, arms mounted on said frame and supporting said bar, and means for adjusting said arms to accommodate them and said bar to different sizes of fenders.

3. The combination with a car frame and its wheel fenders, of a bar having means for connection with the opposite fenders, arms connected at one end to said bar and having means for securing their other ends to said frame, and angle brackets having their horizontal flanges adjustably clamped in said frame, the vertical flanges of said brackets having means for connecting said arms thereto, said arms and brackets being adjustable forward and backward on said frame to adapt said bar for different fenders.

4. The combination with a car frame, and its wheel fenders, of a bar having means for connection with the opposite fenders, arms connected at one end to said bar and having means for connection at their opposite ends with said frame, brackets having horizontal flanges adapted to be clamped between abutting members of said frame, said arms being seated against the vertical flanges of said brackets and having means for adjustable connection therewith to allow said arms to be raised and lowered on said brackets and adjusted for fenders of different length.

5. The combination with a car frame and its wheel fenders, of a bar having means for connection with said fenders, arms whereon said bar is supported, brackets mounted on said frame and having depending flanges provided with diagonally arranged holes upon different levels and bolts adjustably securing said arms in said holes for raising or lowering said bar and adjusting it forward and backward to fit it to the ends of different fenders.

6. The combination with a car frame and wheel fenders, of a bar having slotted ends to receive the corresponding ends of said fenders, means for securing the ends of said fenders in said slots, and means for supporting said bar on said frame.

7. The combination with a car frame and wheel fenders, of a bar having slotted ends to receive the corresponding ends of said fenders, bolts passing through the flanges of said fenders and through said bar for securing them together, and supports for said bar on said frame.

8. The combination with a car frame and wheel fenders, of a bar upon the ends of which the fenders rest, means for securing the ends of the fenders to the bar, supports for said bar, and brackets connecting said supports with said frame, said brackets and supports being mounted for relative adjustment.

In witness whereof, I have hereunto set my hand this 17th day of March, 1924.

PETER C. DAHL.